May 12, 1964 A. H. JOHNSON 3,132,788

TAPE TRANSPORTING MEANS FOR A MAGNETIC RECORDER

Filed Oct. 25, 1961 2 Sheets-Sheet 1

INVENTOR.

A. H. Johnson

INVENTOR.

3,132,788
Patented May 12, 1964

3,132,788

TAPE TRANSPORTING MEANS FOR A MAGNETIC RECORDER

Axel H. Johnson, 1133 Oregon St., Racine, Wis.
Filed Oct. 25, 1961, Ser. No. 147,675
2 Claims. (Cl. 226—184)

This invention relates to magnetic tape recorders, and especially to the means of transporting the tape over the recording heads.

Conventional magnetic tape recorders employ a tape transport mechanism having a capstan that rotates at a constant speed. The tape, after it has traversed the recording head, passes over the periphery of the capstan and is held in contact with the latter by a resilient pressure roller that maintains the tape in non-slipping contact with the capstan so that the tape will move at the same linear rate as that of the periphery of the capstan.

Pressure rollers provided on conventional magnetic tape recorders are made of rubber or similar yieldable material, originally cylindrical in shape and usually of an axial length in excess of the width of the tape. After a period of use, the resilient pressure roller receives a permanent impression or recess about its periphery where it engages the tape. This condition is caused by the substantial pressure existing between the roller and the tape during operation of the recorder. This impression extends axially of the roller and diverges slightly toward the edges of the recess. When a recorder is being operated with a roller recessed as above described, the tape is invariably "pinched" at one of its edges by one of the edges of the recess, causing the tape to "skew" or shift axially of the capstan in the direction of such edge; the result being that the tape traverses the recording head at an angle thereto, resulting in a narrowing of the frequency range of the matter being recorded or played back.

The above-mentioned "skewing" of the tape also results in forcing the tape to rub against the walls of the guide grooves, causing wear of the guide, fraying of the edges of the tape and uneven winding on the take-up reel. This recessed or "spool-shaped" condition of the pressure roller also causes the roller to oscillate axially if not positively confined, resulting in a transverse "weaving" motion being imparted to the tape which motion also affects the uniformity of frequency response. "Weaving" or axial shifting of the tape relative to the capstan caused by pinching of the tape edges by the recess, also tends to unduly wear the periphery of the capstan, reducing the diameter of the latter and consequently affecting the rate of linear travel of the tape after a period of use.

Therefore an object of this invention is to generally improve the transport means and pressure rollers of magnetic tape recorders.

Another object of this invention is to provide a pressure roller that will not tend to shift the tape transversely of its normal direction of travel.

Another object of this invention is to provide a transport means having a pressure roller that will resist permanent deformation that could affect its function.

Further objects and advantages of the invention will become apparent from a consideration of the following detailed description taken in connection with the accompaning drawings wherein an embodiment of the invention is shown. However, it is to be understood that the invention is not limited to the details disclosed but includes all such variations and modifications as fall within the spirit of the invention.

Referring to the drawings.

Figure 1:
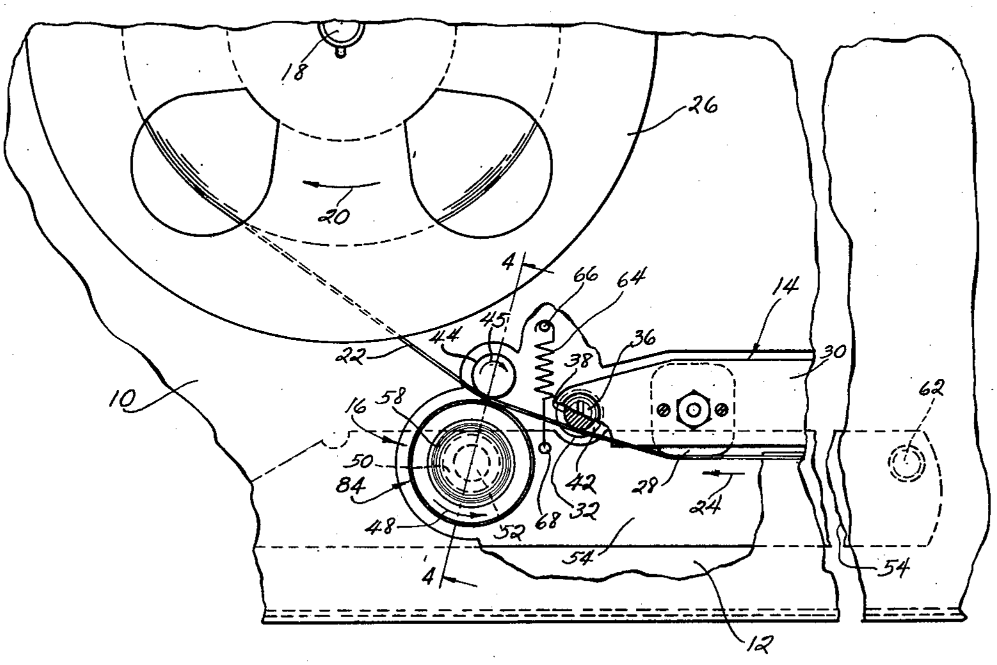
FIG. 1 is a fragmentary plan view of a magnetic tape recorder embodying this invention.
Figure 2:
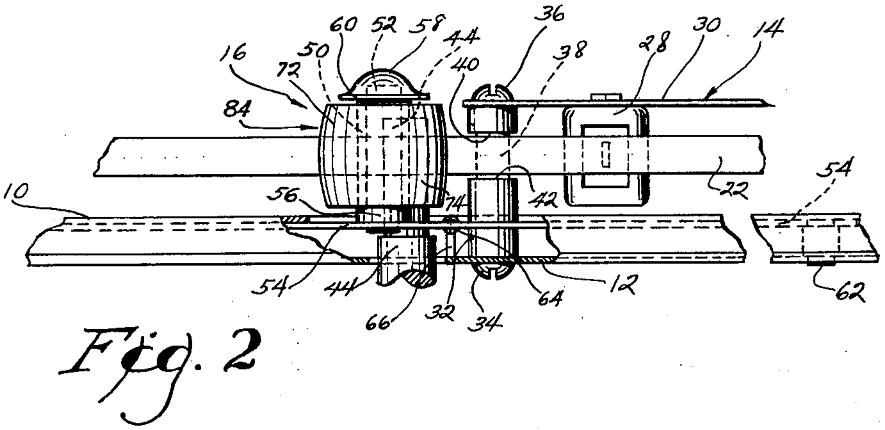
FIG. 2 is a fragmentary, elevational front view of a portion of FIG. 1, and showing the preferred form of the invention.

The invention is shown incorporated in a tape recorder having a deck panel 10, sub frame 12, head assembly 14 and a transport mechanism 16, as shown in FIGS. 1 and 2.

Deck panel 10 provides a cover for the various elements of the mechanism which are mounted on the sub frame 12. The usual take-up reel shaft 18 is mounted for rotation in sub frame 12 and extends above panel 10, and is driven by the usual mechanism not shown, and rotates in the direction of arrow 20 when a recording is being made or played back. A magnetic tape 22 moves from a supply reel, not shown, and in the direction indicated by arrow 24. Take-up reel 26 is carried by shaft 18, and is keyed thereto in the usual manner; tape 22 being reeled thereon as shown in FIG. 1.

Tape 22 traverses a recording head 28 which is supported by a bridge 30. Bridge 30 is mounted upon a pair of pillars or posts, only one post 32 being shown: The posts are identical, however, in all respects. Post 32, and the post not shown, is secured to sub-frame 12 by a screw such as 34 threaded into the post, the latter passing through an aperture in panel 10. Post 32 is of a length so as to position head 28 as shown in FIG. 1. A screw 36 secures bridge 30 to post 32.

Post 32 also serves as a guide for tape 22, as the latter passes transversely across head 28 and then to reel 26. The guide comprises a groove 38 machined in the posts. Groove 38 defines a bottom of reduced diameter and upper and lower guide walls or faces 40 and 42 respectively. The spacing between faces 40 and 42 is such as to permit tape 22 to move freely therebetween, but also confines the tape to a minimum of shifting in a direction axially of post 32, as viewed in FIG. 2.

Transport mechanism 16 comprises a cylindrical capstan 44 which is rotated at a uniform speed in the direction of arrow 45 by a motor, not shown. Capstan 44 is of rigid material that maintains a constant diameter and has a non-yieldable periphery, extends through panel 10 and is so positioned that tape 22 moves with the periphery thereof as the tape passes to reel 26.

The rotation, and peripheral rate of travel of capstan 44 must be uniform in that its function is to transport the tape across head 28 at a uniform rate; the tape moving at a linear rate equal to that of the periphery of the capstan.

A freely-rotating pressure roller 84 is positioned adjacent capstan 44, rotates in the direction of arrow 48 by contact with tape 22, and serves to maintain a positive non-slipping contact between capstan 44 and the tape. Roller 84 comprises a body portion of resilient and yieldable material such as rubber. A bushing 50, integral with roller 84, provides a suitable bearing means to assure freedom of rotation for the roller. A pressure-roller post 52 forms the journal about which roller 84 rotates. Post 52 is mounted on a pivoted arm 54 (to be later described). Post 52 is provided with an enlarged portion 56 which serves to position roller 84 axially. A cap 58 of the "snap-on" variety is placed on the post 52 after a suitable number of washers 60 are placed over the roller 84, to prevent excessive axial shifting of the roller.

Arm 54 is positioned below the surface of panel 10 and extends longitudinally as shown. A pivot post 62 is secured to sub-frame 12 at a point spaced from post 52. Arm 54 is pivoted to post 62 so that roller 84 is permitted to move toward or away from capstan 44. A tension spring 64 extends from a post 66 secured to subframe 12, and a hole 68 provided in arm 54 as shown in FIG. 1. Thus arm 54 is biased toward capstan 44, thereby maintaining a positive contact between tape 22 and roller 84. Suitable means (not shown), is provided to control arm 54 and to swing it about post 62 so that roller 84 can be brought into contact with tape 22, or withdrawn therefrom.

Figure 4:
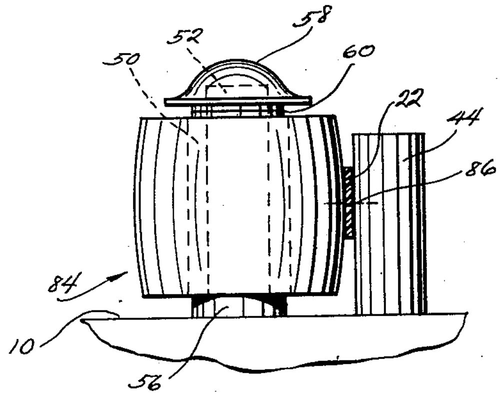
FIG. 4 is still another modification of the pressure roller embodying this invention, and embraced by FIG. 2.

As mentioned before, pressure roller 84 is resilient and is provided with a bushing 50 as shown in FIGS. 1, 2 and 4. Roller 84 in this instance is of rubber and is convex or "barrel-shaped" having a maximum diameter at 86, intermediate the ends. The maximum diameter 86 is located so as to contact the approximate center of the tape, initially, but preferably the roller does not engage the edges of the tape when the roller 84 is in engagement with the latter, as shown in FIG. 5.

Figure 3:
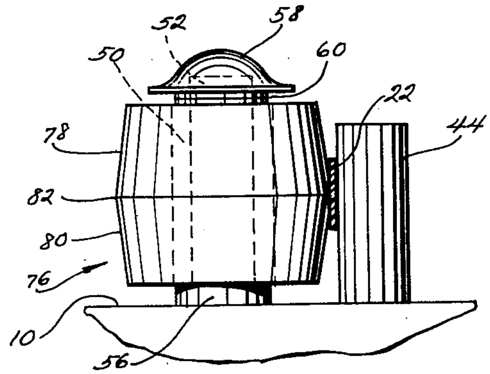
FIG. 3 is one modification of the pressure roller.

An alternative design of the pressure roller is shown in FIG. 3. Roller 76 is of resilient material and is integral with bushing 50 as previously described with respect to roller 84, and comprises conic frustum portions 78 and 80 which have their common bases coinciding with a plane normal to the axis of roller 76 as at 82, which plane engages the center of the tape 22.

The operation of the above invention will now be summarized and explained to make clear as to how it meets the objects set forth.

Figure 5:
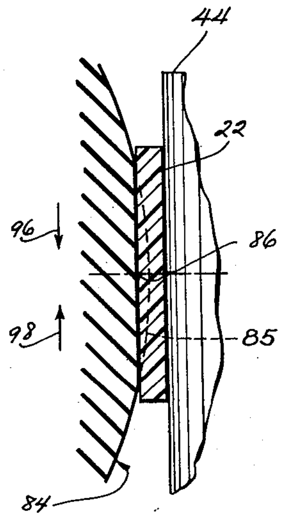
FIG. 5 is an enlarged fragmentary view of a portion of the roller of FIG. 4, partly in section, illustrating the nature of the deformation of that roller when in operating engagement with the tape.

Referring to FIGS. 4 and 5, it is obvious that contact pressure of roller 84 against tape 22 will tend to broaden the area of contact between the roller and the tape; however, the pressure biasing roller 84 toward the tape 22 is such that the contact will not extend to the edges of the tape 22 so as to pinch the edges and cause the tape to "skew" or shift axially of the roller 84: The result being that the tape will traverse the capstan 44 tangentially with no axial shifting or "weaving" thus avoiding excessive wear of the capstan and unsteadiness in frequency response.

Similar results are obtained with a roller such as 76 and shown in FIG. 3. The pressure of roller 76 against tape 22 will broaden the contact with the tape without engaging the edge of the tape.

The roller of FIG. 4, having a curved surface of revolution, can best be described by reference to enlarged FIG. 5. The original contour of the roller 84 is indicated by a dotted line 85. It will be clear that the contact of roller 84 with the surface of tape 22 will compel the roller to conform to the tape, with the area of contact approaching the edges of the tape, but not reaching them. The force normal to the tape at point 86 which point coincides with the maximum diameter of roller 84, will be resolved into two equal and opposed components 96 and 98, directed toward line 86 an shown in FIG. 7, each component tending to shift tape 22 in the component's direction. It is significant that line 86 needs not coincide with the longitudinal center line of the tape 22. Inasmuch as these components are equal in magnitude, and opposed, they are in equilibrium and the tape will not shift but will traverse the capstan 44 without axial shifting relative to the latter. The contact area between roller 84 and tape 22 is less than the width of the tape, as was also mentioned with regard to roller 46 and which contact area is controlled by the tension of spring 64.

Inasmuch as the pressure roller of this invention will maintain a contact area less than the width of the magnetic tape, there is no tendency for the roller to become recessed or "spool-shaped" so as to cause the tape to be "pinched" and therefore to shift or "weave" from the normal path as the tape traverses the recording heads which weaving can cause a loss of frequency response, injury to the edges of the tape and fraying thereof, and wear to the capstan and tape guides.

The above being a complete description of an illustrative embodiment of the invention, what is claimed as new and desired to be secured by Letters Patent of the United States is:

1. In a magnetic recorder, a means of transporting a tape at a substantially-uniform rate in a direction normal to the width thereof, comprising a rotating cylindrical capstan of rigid material, said tape being in contact with the periphery of said capstan and moving tangentially therewith, a pressure roller of yieldable material resiliently engaging said tape and biased to maintain a positive contact between said tape and said capstan, said roller having axially-spaced ends and an intermediate portion having a diameter in excess of that of said ends, said intermediate portion defining the common base of conic frustums converging toward said ends, said portion engaging said tape intermediate the edges of said tape.

2. In a magnetic recorder, a means of transporting a tape at a substantially-uniform rate in a direction normal to the width thereof, comprising a rotating cylindrical capstan of rigid material, said tape being in contact with the periphery of said capstan and moving tangentially therewith, a pressure roller of yieldable material resiliently engaging said tape and being biased to maintain a positive contact between said tape and said capstan, said roller having axially-spaced ends and an intermediate portion of a diameter in excess of that of said ends and gradually converging in diameter from said portion toward said ends, said intermediate portion engaging said tape intermediate the edges of said tape.

References Cited in the file of this patent

UNITED STATES PATENTS

| | | |
|---|---|---|
| 1,998,931 | Kellogg | Apr. 23, 1935 |
| 2,454,021 | Wilson | Nov. 16, 1948 |
| 2,653,814 | Lorig | Sept. 29, 1953 |
| 2,706,625 | Lorig | Apr. 19, 1955 |
| 2,848,221 | Camras | Aug. 19, 1958 |
| 2,854,235 | Mursch | Sept. 30, 1958 |
| 2,913,192 | Mullin | Nov. 17, 1959 |